Feb. 19, 1946.　　　E. E. WEMP　　　2,395,308
CENTRIFUGAL CLUTCH
Filed Aug. 25, 1944　　　2 Sheets-Sheet 1

INVENTOR.
Ernest E. Wemp
BY
Barnes, Kisselle, Laughlin & Raisch
Attorneys

Feb. 19, 1946. E. E. WEMP 2,395,308
CENTRIFUGAL CLUTCH
Filed Aug. 25, 1944 2 Sheets-Sheet 2
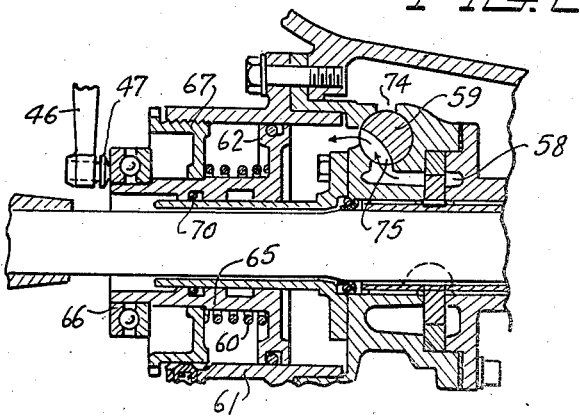
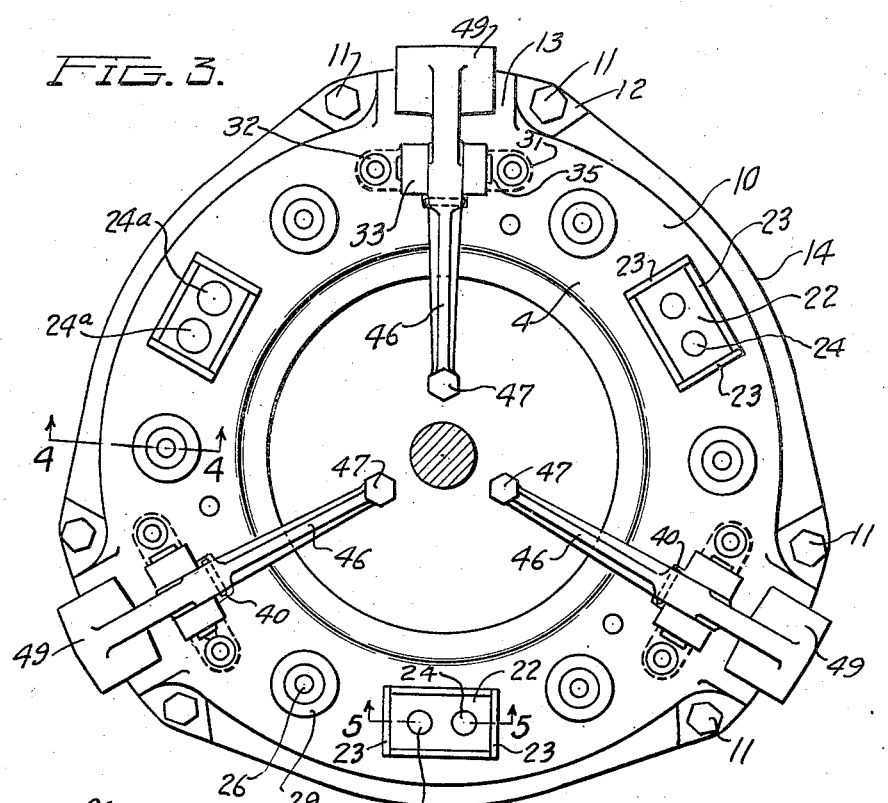
INVENTOR.
Ernest E. Wemp Patented Feb. 19, 1946

2,395,308

UNITED STATES PATENT OFFICE 2,395,308

CENTRIFUGAL CLUTCH

Ernest E. Wemp, Detroit, Mich.

Application August 25, 1944, Serial No. 551,081

8 Claims. (Cl. 192—103)

This invention relates to a centrifugal clutch construction designed particularly for use in automotive vehicles.

It is well appreciated by those versed in the art that where a conventional gear change transmission is used between the engine and the traction wheels of an automotive vehicle, the power line or torque line is usually broken in order to facilitate a shift of the gearing. This is ordinarily done by releasing the friction clutch. However, other means may be employed for breaking the torque line to thus take the torque load off the transmission to facilitate shifting of the gears such, for example, as a free wheeling coupling, which in effect, is a one way drive coupling which permits the traction wheels and the vehicle to overrun the engine. This arrangement permits the engine to decelerate to or near idling speed regardless of the rate of movement of the vehicle. Other means controllable by the operator or operating automatically may disrupt or break the torque line for this purpose.

The present invention provides a clutch construction adapted to be used in a system where the torque line is to be broken by means other than the clutch for the purpose of shifting the gears or for other purposes. To these ends, a centrifugal clutch is provided which is disengaged at normal engine idling speeds and which becomes engaged upon acceleration of the engine above idling speeds and which remains engaged during all operation above the R. P. M. of clutch engagement.

The objects of the invention include these: The provision of a centrifugal clutch which, while incorporating weight masses which move centrifugally, occupies a minimum of axial space and thus the clutch is of a compact construction; the provision of a clutch which has a torque capacity, obtained from centrifugal force alone, which is insufficient for transmitting maximum engine torque at speeds below about 1800 to 2000 R. P. M., together with means for furnishing supplemental clutch packing pressure; the provision of a novel hydraulic means for supplementing the clutch packing pressure to provide adequate torque capacity at R. P. M. below about 1800 to 2000 R. P. M.; the provision of a centrifugal clutch embodying a simple rugged construction wherein driving lugs are employed between clutch parts and which are accessible and are arranged to be employed as balancing elements.

These and other objects of the invention will be more fully appreciated as the detailed description progresses in connection with the accompanying drawings. The drawings show one clutch construction made in accordance with the invention.

Fig. 2 is a sectional view illustrating the operative position of the supplemental clutch packing means.

Fig. 3 is an elevational view of the centrifugal clutch taken substantially on line 3—3 of Fig. 1.

Fig. 5 is a view taken substantially on line 5—5 of Fig. 3 showing the combined driving lug and balancing mass.

Figure 1:
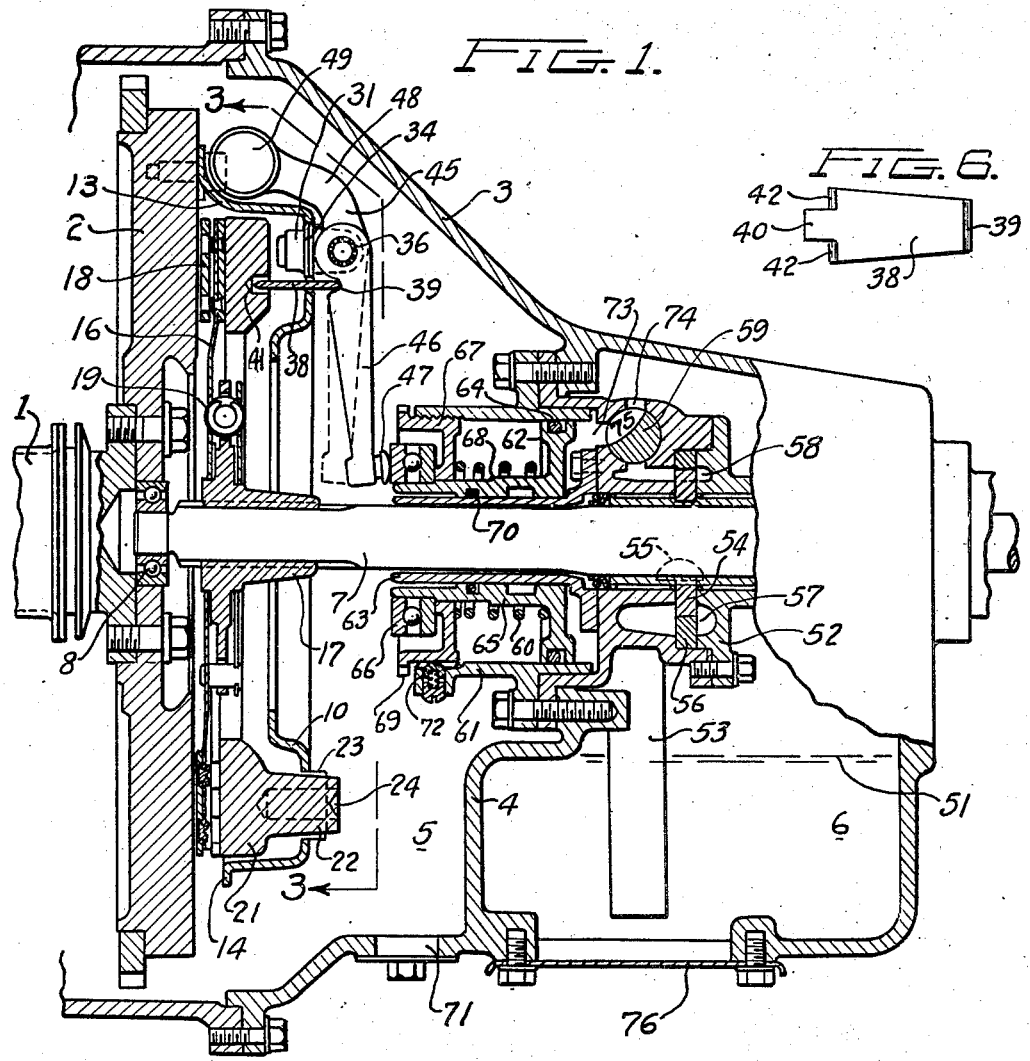
Fig. 1 is a cross sectional view taken through a clutch constructed in accordance with the invention and showing the same in the housing therefor.

In Fig. 1 the crank shaft of an engine is shown at 1 attached to which is a fly wheel 2. The housing for the fly wheel and clutch is generally illustrated at 3. The housing is divided by a partition 4 so as to form a chamber for the clutch, as shown at 5, which is to be a dry chamber and a chamber 6 for containing a liquid for hydraulic purposes. A shaft 7 has one end journalled in the fly wheel as at 8, and with respect to the clutch this is the driven shaft while the crank shaft 1 is the driving member.

Attached to the fly wheel is a clutch cover plate 10 shaped, as illustrated in Fig. 3, and connected to the fly wheel by cap screws 11. The cover plate has frontal portions, there being three frontal portions shown, and each frontal portion has lands 12 for lying against the fly wheel and for receiving the cap screws. Between adjacent cap screws, the metal is formed in a curved manner forming a sort of a fillet or reenforcement 13. The curvature is such as to cooperate with centrifugal weights, as will presently be seen. Between the frontal portions the periphery of the cover plate, as at 14, is raised from the fly wheel to provide ventilating spaces, as will be seen by reference to Fig. 1.

The driven member of the clutch is generally illustrated at 16. It has a hub 17 splined to the driven shaft and facings 18 of friction material. The facings are normally yieldably spaced axially, as shown in Fig. 1, so that the facing zone is compressible. This is done by interposing a suitable yielding arrangement between the two facings in any acceptable manner well known to those versed in the art. Between the hub and the outer portion of the driven disc there is preferably disposed a yieldable vibration dampening structure in the form of a plurality of coil springs 19 arranged in an annular formation and providing a yielding drive between the outer zone of the driven disc and the hub 17. This yielding arrangement is well known to those well versed in the art.

A pressure plate is disposed within the cover plate and arranged on the opposite side of the driven disc from the fly wheel and it is axially shiftable in order to pack the driven disc between the pressure plate and the fly wheel. The pressure plate has a number of lugs formed integrally thereon, preferably three in number, which provide counterbalancing masses and driving lugs. These lugs are shown at 22 and they project axially through openings 23 in the cover plate. As shown in Fig. 5, the metal of the cover plate is formed with flanges 23 which engage opposite sides of the lugs 22. There is a sliding fit between the lugs and the flanges 23 with the result that the pressure plate is tied to the cover plate in driving relationship. The pressure plate, however, may shift axially relative to the cover plate and the sides of the lugs which engage the cover plate are parallel to each other.

As will be observed, these lugs are readily accessible as they project through the cover plate and provide such adequate mass of material that holes may be drilled therein for balancing purposes. In the formation of the pressure plate, each lug is preferably initially formed with one or more piloting recesses 24, for the reception of a drilling instrument. After the clutch is assembled and before it is installed in the housing 3, it may be balanced by the drilling of holes or recesses in the lugs. As shown in Fig. 3, one lug has been drilled out to form recesses 24a. Adequate metal remains to serve the purpose of driving the pressure plate. Various unbalanced conditions can be met and balanced by the drilling of one or more of the lugs. For example, as Fig. 3 is viewed, it may be assumed that the upper left hand portion of the assembly was originally heavy and was lightened by drilling the lug at 24a. The lug in the upper left hand region of the assembly, as is shown in Fig. 3, is disposed at a substantial radius so that the removal of a given weight of material is quite effective. Should, for example, the assembly be heavy in the region of the centrifugal lever shown in the lower right hand region of Fig. 3, then the two lugs adjacent thereto can be lightened. These two lugs do not have as large an effective radius but provide twice the amount of metal which can be removed for lightening purposes.

Figure 4:
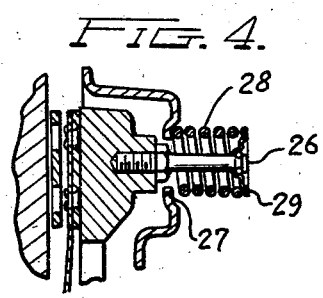
Fig. 4 is a sectional view taken substantially on line 4—4 of Fig. 3, showing a retractor spring for the pressure plate.

The pressure plate is normally retracted so that the clutch is disengaged. This is accomplished by retractor springs, of which there are six as shown in Fig. 3. Attached to the fly wheel are pins 26 which project out through openings 27 in the cover plate and around each pin is a coil spring 28 reacting against the cover plate and against a washer 29 on the end of a pin. This will be seen by reference to Fig. 4.

Figure 6:
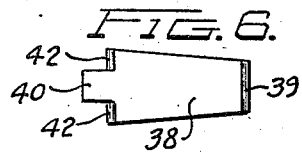
Fig. 6 is a plan view of a strut through which clutch packing forces are delivered.

There are a number of combined centrifugal weights and levers mounted on the clutch and there are preferably three of these mounted on the cover plate. There is a bracket for each lever having a body portion 31 disposed inside the cover plate and secured to the cover plate by rivets 32 or the like. Each bracket has a bifurcated portion 33 extending through an aperture in the cover plate. The parts are accurately formed so that the bracket makes contact with the outer wall of the opening in the cover plate, as shown at 34. Each centrifugal lever is fulcrumed in the bifurcated portion of each bracket, the fulcrum including a pin 35 preferably employed with needle roller bearings 36. The aperture, through which the bifurcated part of the bracket extends, is provided with a lateral portion 37 and a strut 38 extends through this part of the aperture and lies between the lever and the pressure plate. The form of the strut is shown in Fig. 6. It has a rounded end 39 for contacting in a recess in the lever. The other end has a tongue 40, which serves as a pilot and projects into a recess 41 in the pressure plate and on opposite sides of the tongue the metal is rounded as at 42 for contact with the face of the pressure plate.

Each combined centrifugal member and lever, shown at 45, is mounted on the fulcrum at an intermediate part of its length. The lever arm, as shown at 46, extends radially inwardly and has a suitable contact piece or tip 47 at its inner end. The lever portion 46 is preferably arranged so that the centrifugal forces thereon are quite neutral and exert no substantial turning moment around the fulcrum. The outer portion of the member 45 constitutes the centrifugal mass. This portion is curved or otherwise shaped as at 48, so as to clear the cover plate and extend in an axial direction toward the fly wheel. Thus, the member overlies the peripheral edge of the cover plate. The end is enlarged as at 49 to provide the centrifugal mass per se. The enlarged portion is designed to lie in close proximity to and nestle in the space between two of the attaching cap screws. The curved portion 13 of the cover plate is preferably formed on a radius such as to accommodate and provide space for the weighted mass 49. In this manner the overall axial length of the assembly is minimized since these weighted portions occupy, in effect, the space between the back of the cover plate and the fly wheel. The housing 3 is as far enough removed so that the weighted portions 49 may have adequate movement outwardly and rearwardly around the fulcrums in the operation of the clutch. The purpose of forming the parts so that the brackets contact at 34 with the cover plate is so that the centrifugal forces are transmitted directly to the cover plate, thus relieving the rivets 32 of twisting or torque action to which they would otherwise be subjected in overcoming the centrifugal force present in the lever system.

This clutch is designed so that it is disengaged, as shown in Fig. 1, when the engine in the automotive vehicle is operating at about idling R. P. M. Present day engines idle about 500 or 600 R. P. M. and the clutch may be set up to begin to engage under centrifugal force as the R. P. M. increases to about 700 or 800 R. P. M. This may vary slightly with different engines. The strength of the retractor springs 28 is sufficient to overcome centrifugal force at the selected low R. P. M. and hold the clutch disengaged. However, when the R. P. M. increases the centrifugal masses 49, including also the centrifugal mass in the curved portions 48, swing outwardly around the fulcrums due to the unbalanced condition. This swings the lever portions 46 inwardly toward the fly wheel and the compression struts 38 push on the pressure plate so as to urge it toward the fly wheel. This, of course, compresses the retractor springs and the pressure plate moves into engagement with the driven disc so that the facings thereof are frictionally engaged between the pressure plate and the fly wheel.

The present clutch is selected with reference to the engine so that preferably it does not have sufficient torque capacity to transmit maximum engine torque at R. P. M. lower than about 1800 to 2000. This facilitates a smooth engaging action but requires supplemental means for providing added packing pressure in order to transmit maximum engine torque at speeds below about 1800 to 2000 R. P. M.

As shown in Fig. 1, the chamber 6 constitutes a sump for a suitable liquid or oil represented by the level 51. This sump chamber is sealed by the partition 4 from the chamber 5 so that the clutch operates in a dry condition. A pump housing 52 is located in the chamber 6 around the shaft 7 and the pump inlet, as at 53, projects into the liquid in the sump. The pump shown is of the type having two cooperating members, the inner one of which is shown at 54, driven by the shaft 7 by a key 55 and having an outer member 56. These members have intermeshing teeth and operate between the housing portions. The housing has a low pressure chamber 57 into which the intake pipe 53 communicates, and an outlet or high pressure chamber 58. The particular pump structure in itself forms no part of the present invention, and the type of pump shown is known to those versed in the art. A control valve 59 is advantageously mounted in the pump body.

A cylinder 61 is mounted in the partition 4 and it has a piston 62 therein slidably mounted on a sleeve 63. This piston is preferably equipped with O ring sealing members 64 and 70. The piston has a sleeve extension 65 mounted upon the end of which is an anti-friction bearing 66 for contact with the lever tips 47. A spring 60 serves to keep the piston retracted and functions between the piston and an adjustable member 67 screw threaded into the end of the cylinder. The member 67 determines the stroke of the piston. In retracted position, as shown in Fig. 1, the anti-friction bearing contacts the stop member 67, and in the forward position as shown in Fig. 2, the shoulder 68 on the piston extension strikes the stop member. The stop member is adjustable on its screw threads by means of the application of a suitable tool to teeth or abutments 69, the tool being entered through the cap closed opening 71. The stop member is held in adjusted position by a spring pressed detent 72.

There is a port 73 in the cylinder and a port 74 in the pump housing which communicates into the sump chamber and the valve has a passageway or port 75. As shown in Fig. 1, the valve connects the cylinder to the sump chamber and the action of the spring 60 displaces the liquid back into the sump. When the valve is turned to the position as shown in Fig. 2, the liquid under pressure flows into the cylinder and shifts the piston to the left so that it engages the lever tips and swings the levers clockwise, as Fig. 1 is viewed, to thus supplement the clutch packing pressure.

Suitable control means (not shown) may be employed so that the operator has control of the valve 59. Also a suitable pressure relief valve arrangement (not shown) may be employed so that when the valve is closed an adequate pressure and relief is provided for the operating of the pump. In making the assembly, the pump and piston sub-assembly may be located before the housing 3 is secured to the engine and then the inlet pipe 53 may be located through the opening closed by the plate 76.

In the operation of the clutch it begins to engage centrifugally as the speed of the engine is increased above idling speed. In this action, the pressure plate is pushed into engagement with the driven disc. By suitable control means, however, an operator of the vehicle shifts the valve 59 so that the clutch packing pressure is supplemented hydraulically. In this action the piston shifts to the left and rocks the levers. The piston can only shift a given distance by reason of the stop 68. The member 67 is initially adjusted to a position corresponding to that required by a new clutch facing. As the clutch facings wear and become thinner it is required that the piston shift further to the left. This may be accomplished by adjusting the stop member 67 to the left. Yet, the stroke of the piston remains the same. It will be noted, however, that the facings 18 are held yieldably spaced with the result that as the R. P. M. increases above about 2000 R. P. M. the centrifugal force increases and the levers continue to shift slightly, due to such compression with the result that the lever tips 47 move away from the bearing 66. At high R. P. M. the centrifugal force alone provides adequate torque capacity and when the lever tips leave the bearing 66 all axial thrust on the engine crank shaft is removed. In this action there may also be some flexing or springing of the cover plate or other parts due to the centrifugal force which will aid in the shifting of the lever tips away from the bearing 66.

The clutch is not disengageable by controllable means and, therefore, remains engaged at all times of operation above the R. P. M. selected for centrifugal engagement and disengagement. Therefore, where the clutch is used with a gear shift transmission which requires that the torque line be broken for the purpose of shifting gears, means other than the clutch must be employed for such purposes. Such a means may be the well known free wheeling device. The particular arrangement preferred, however, is covered by a separate application. However, in some mechanisms where breaking of the torque line is unnecessary, as in the case of some forms of automatic transmissions, the clutch may be used without any additional device for breaking the torque line.

I claim:

1. A centrifugal clutch comprising, a fly wheel, a cover plate having frontal portions for attachment to the fly wheel and a back wall portion spaced from the fly wheel, a pressure plate disposed within the cover plate, a driven disc between the fly wheel and pressure plate and adapted to be frictionally engaged therebetween, means establishing a drive connection between the pressure plate and the cover plate for axial shift of the pressure plate, a plurality of unbalanced centrifugal mass members each in the form of a lever, means pivotally mounting each lever at an intermediate portion to the back wall of the cover plate, the outer portion of each lever being of curved formation and extending toward the fly wheel so as to overlie the peripheral wall of the cover plate, the lever having an enlarged centrifugal mass on its outer end normally lying adjacent the fly wheel, the inner portion of each lever extending inwardly to a point adjacent the axis and adapted to have power applied thereto, and a compression strut for each lever extending through the back wall of the cover plate and having its opposite ends in engagement with the pressure plate and with the lever, said compression strut being located radially inwardly of the pivotal mounting of the lever.

2. A centrifugal clutch comprising, a fly wheel, a cover plate having frontal portions for attachment to the fly wheel and a back wall portion spaced from the fly wheel, a pressure plate disposed within the cover plate, a driven disc between the fly wheel and pressure plate and adapted to be frictionally engaged therebetween, means establishing a drive connection between the pressure plate and the cover plate for axial shift of the pressure plate, a plurality of levers each providing an unbalanced centrifugal mass, means on the cover plate providing a fulcrum for each lever outside of the cover plate, each lever being mounted on its fulcrum at an intermediate portion, each lever having a lever arm extending inwardly and terminating adjacent the axis and adapted to have power applied thereto, a compression strut for each lever located inwardly from the fulcrum point and extending through the cover plate and having its ends in engagement with the lever and the pressure plate, the outer end of each lever extending radially outwardly and toward the fly wheel and having a weighted mass on its end lying adjacent the fly wheel and radially outwardly of the periphery of the cover plate, whereby centrifugal force causes the weighted mass to shift about the fulcrum in a direction which is radially outwardly and away from the fly wheel with the outer portion of the lever functioning as a lever of the first order to urge the pressure plate into engagement with the driven disc and power means for engaging the inner ends of the levers to shift the levers in the same direction that centrifugal force shifts the levers, whereby the inner portions of the levers function as levers of the second order for shifting the pressure plate toward the driven member.

3. A centrifugal clutch comprising, a fly wheel, a cover plate having frontal portions for attachment to the fly wheel and a rear wall portion spaced from the fly wheel, each frontal portion having spaced lands for direct abutment with the fly wheel with an intermediate re-enforcing curved part between the lands, a driven disc, a pressure plate within the cover plate, means providing a driving connection between the pressure plate and the cover plate whereby the pressure plate may shift axially for the engagement with the driven disc to pack the same between the fly wheel and the pressure plate, a plurality of levers, means on the cover plate providing a fulcrum for each lever on the outside of the cover plate, the outer end of each lever extending radially outwardly and in a direction toward the fly wheel and having a weighted mass on its end, the weighted mass of each lever being arranged to fit between the two lands of each frontal portion and substantially fit the curved re-enforcing formation of the cover plate, the inner ends of the levers extending inwardly toward the axis and adapted to have power applied thereto, a compression strut for each lever extending through the cover plate and having its ends engaging the pressure plate and lever and disposed radially inward from the fulcrum, whereby the pressure plate is urged into packing relationship with the driven disc by the centrifugal force with the outer portions of the levers acting as levers of the first order, and means for applying power to the inner ends of the levers to urge the pressure plate toward engagement with the driven disc with the inner ends of the members acting as levers of the second order.

4. The clutch, as claimed in claim 3, wherein the means for providing the fulcrum for each lever is a bracket having a body portion attached to the inside of the cover plate, the cover plate having an opening for each bracket, each bracket having a bifurcated portion projecting through the cover plate and providing the fulcrum, the outer portion of each bracket contacting with the outermost wall of the opening in the cover plate for resisting centrifugal forces, the inner portion of each opening being cut away inwardly of the bracket for accommodating the strut.

5. A centrifugal clutch for the engine in an automotive vehicle having driving and driven members arranged for frictional engagement and including a fly wheel, a cover plate attached thereto, a driven member and a pressure plate within the cover plate with the pressure plate axially shiftable and having a driving connection with the cover plate, a plurality of levers each having a fulcrum outside of the cover plate, the outer end of each lever extending radially outwardly and having a bend formation so as to extend toward the fly wheel and having a centrifugal mass on its end overlying the periphery of the cover plate, each lever having an inner portion extending radially inwardly and terminating in a tip, means for applying power to the lever tips to rock the levers on their fulcrums, the unbalanced centrifugal weights serving to rock the levers on their fulcrums under centrifugal force in the same direction as the power means rocks their levers, a compression strut for each lever located radially inwardly from the fulcrums thereof and passing through the cover plate and positioned between the pressure plate and the lever for the urging of the pressure plate into frictional engagement with the driven member when the levers are rocked by centrifugal force and by the power means, the unbalanced centrifugal masses and the leverage arrangement being such that the centrifugal weights provide clutch packing pressure insufficient for providing torque capacity adequate for transmitting maximum engine torque at speeds lower than about 1800 to 2000 R. P. M., the power means applicable to the lever tips serving to supplement the packing pressure in the speed range below about 1800 to 2000 R. P. M.

6. A centrifugal clutch comprising, a fly wheel, a pressure plate, a driven disc between the fly wheel and pressure plate, a cover plate for covering the driven disc and pressure plate, said cover plate having three equally spaced frontal portions for attachment to the fly wheel, three levers pivotally mounted on the back of the cover plate with each lever mounted adjacent a frontal portion, each lever having an unbalanced centrifugal mass overlying the periphery of the cover plate adjacent the frontal portions, a compression strut for each lever passing through the cover plate and positioned radially inwardly from the fulcrum, the ends of the strut engaging the pressure plate and the lever so that movement of the lever under centrifugal force shifts the pressure plate into engagement with the driven member, the cover plate having three openings therein equally spaced between the three levers, the pressure plate having three driving lugs projecting through the openings to provide a driving connection between the cover plate and pressure plate so that the cover plate may shift axially, a retractor spring positioned in each space between a lever and a driving lug on the outside of the cover plate for retracting the pressure plate toward the cover plate to normally hold the clutch disengaged, the inner ends of the levers terminating radially inwardly from the struts, and means for applying power to the inner ends of the levers to shift the levers in a direction such as to supplement the centrifugal force in forcing the pressure plate into engagement with the driven member.

7. A centrifugal clutch comprising, a cover plate having frontal portions for attachment to a driving member such as a fly wheel and a back wall portion spaced from the frontal portions, a pressure plate disposed within the cover plate and adapted to frictionally engage a clutch driven member disposed between the pressure plate and the driving member, means establishing a drive connection between the pressure plate and the cover plate for axial shift of the pressure plate, a plurality of unbalanced centrifugal mass members each in the form of a lever, means pivotally mounting each lever at an intermediate portion to the back wall of the cover plate, the outer portion of each lever extending in a direction toward the frontal portions of the cover plate so as to overlie the peripheral wall of the cover plate, each lever having an enlarged centrifugal mass on its outer end normally lying adjacent a frontal portion of the cover plate, the inner portion of each lever extending inwardly to a point adjacent the axis and adapted to have power applied thereto, and a compression strut for each lever extending through the back wall of the cover plate and having its opposite ends in engagement with the pressure plate and with the lever, said compression strut being located radially inwardly of the pivotal mounting of the lever.

8. A centrifugal clutch comprising, a cover plate having frontal portions for attachment to a driving member such as a fly wheel and a back wall portion spaced from the frontal portions, a pressure plate disposed within the cover plate and adapted to frictionally engage a clutch driven member disposed between the pressure plate and the driving member, means establishing a drive connection between the pressure plate and the cover plate for axial shift of the pressure plate, a plurality of levers each providing an unbalanced centrifugal mass, means providing a fulcrum for each lever on the back wall of the cover plate, each lever being mounted on its fulcrum at an intermediate portion, each lever having a lever arm extending inwardly and terminating adjacent the axis and adapted to have power applied thereto, a compression strut for each lever located inwardly from the fulcrum point and having its ends in engagement with the lever and the pressure plate, the outer end of each lever extending radially outwardly and toward the frontal portions of the cover plate and having a weighted mass on its end lying adjacent a frontal portion and radially outwardly of the periphery of the cover plate, whereby centrifugal force causes the weighted mass to shift about the fulcrum in a direction which is radially outwardly and away from the frontal portion with the outer portion of the lever functioning as a lever of the first order to urge the pressure plate into engagement with the driven disc, and means for engaging the inner ends of the levers to shift the levers in the same direction as the centrifugal force shifts the levers, whereby the inner portions of the levers function as levers of the second order for shifting the pressure plate toward the driven member.

ERNEST E. WEMP.